(12) United States Patent
Schmidt et al.

(10) Patent No.: US 7,639,182 B2
(45) Date of Patent: Dec. 29, 2009

(54) DISTANCE MEASUREMENT IN A RADIO COMMUNICATION DEVICE

(75) Inventors: Andreas Schmidt, Braunschweig (DE); Norbert Schwagmann, Braunschweig (DE); Achim Luft, Braunschweig (DE); Michael Benkert, Burgdorf-Hohenassel (DE)

(73) Assignee: Infineon Technologies AG (DE)

( * ) Notice: Subject to any disclaimer, the term of this patent is extended or adjusted under 35 U.S.C. 154(b) by 232 days.

(21) Appl. No.: 11/696,934

(22) Filed: Apr. 5, 2007

(65) Prior Publication Data

US 2008/0246651 A1    Oct. 9, 2008

(51) Int. Cl.
*G01S 3/02* (2006.01)
*H04W 24/00* (2006.01)
*H04L 12/60* (2006.01)

(52) U.S. Cl. ............... 342/458; 455/456.1; 370/352

(58) Field of Classification Search ............ 342/458; 455/456.1; 370/352
See application file for complete search history.

(56) References Cited

U.S. PATENT DOCUMENTS

2007/0072624 A1* 3/2007 Niemenmaa et al. ...... 455/456.1
2008/0080479 A1* 4/2008 Maes .......................... 370/352

OTHER PUBLICATIONS

Bluetooth Specification Version 2.0, Nov. 4, 2004.
Standard ECMA-368 "High Rate Ultra Wideband PHY and MAC Standard", 1st Edition, Dec. 2005.
Standard ECMA-369 "MAC-PHY Interface for ECMA-368"; 1st Edition, Dec. 2005.

* cited by examiner

*Primary Examiner*—Thomas H Tarcza
*Assistant Examiner*—Harry Liu
(74) *Attorney, Agent, or Firm*—Dickstein, Shapiro, LLP.

(57) ABSTRACT

A radio communication arrangement including a plurality of transceivers and a distance measurement managing circuit. The distance measurement managing circuit is situated in a communication layer higher than the physical layer, is coupled with the plurality of transceivers, and controls the plurality of transceivers for measuring the distances of the respective plurality of transceivers to a specified position. The distance measurement managing circuit also receives and processes distance measurement values determined by the plurality of transceivers.

24 Claims, 9 Drawing Sheets

DISTANCE MEASUREMENT IN A RADIO COMMUNICATION DEVICE

BACKGROUND

The present invention relates generally to a radio communication arrangement, methods for distance measuring, and a distance measurement managing circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Distance measuring may mean the determination of the distance between two points in space using a direct or indirect comparison with a measure of length, for example the meter. The smallest physically possible length is the so called Planck length which is about $10^{-35}$ m. This is the smallest length in which physical space can be divided. The physically relevant region of lengths starts at $10^{-18}$ m which is about the magnitude of the size of the elementary particles and reaches until $10^{26}$ m. Since therefore, the smallest physically relevant length and the biggest physically relevant length differ by a factor of $10^{44}$, a big number of different methods for measuring lengths are necessary depending on the magnitude of the length that is to be measured.

The simplest form of distance measuring is the direct measurement. This means the direct comparison of the distance is to be determined with a scale. This type of measurement is only possible for a limited range of lengths since scales cannot be constructed in arbitrary sizes. The smallest scales are constructed using lithographic methods and are of the magnitude of only few micrometers. They can be used under the microscope like a normal measuring rod. The largest scales are constructed from flexible steel bands with lengths of up to over 100 m. All scales to be used are based on a length standard, for example the meter prototype. This means that the scales must be calibrated before using. In this way, length measurements all around the world can be compared.

The direct measurement of distances cannot be used in many cases. This may be due to the size of the length to be measured or due to the fact that the points the distance of which should be measured are not accessible. More universal and comfortable methods are the indirect methods for distance measurement. In indirect methods, the distance is not measured itself but a quantity which depends on the distance like the brightness of a star, the runtime of an echo or the direction of a bearing is measured. Indirect methods have to be calibrated by a comparison with known scales such that they can still be compared with other length measurements.

An important indirect method for distance measuring for radio communication systems is the runtime measurement. This method is based on the fact that electromagnetic waves and acoustic waves propagate with definite known velocities. One can send a signal to an object reflecting the signal and measure the time the signal takes for the way to the object and back from the object and calculate the distance to the object from the runtime $\Delta t$ (for the way to the object and back from the object) and the propagating velocity c of the signal according to $$r = \frac{c \cdot \Delta t}{2}.$$

For example, bats use ultrasonic signals to determine the distance to obstacles and their prey. In measurement technology this method is used for example using Sonar for distance measurements under water, e.g. in submarines. Radar systems similarly use electromagnetic waves for distance measurements. Also light can be used for this measurement method.

When using this measuring method, it should be taken into account that the propagation velocity of the wave depends on the medium and the state of the medium (for example the temperature) in which this wave propagates. However, for the propagation of the electromagnetic waves in air the inaccuracies caused by the state of the medium are negligible. In this case, other factors like for example interference effects play a more important role.

In some radio technologies, the principle of runtime measurements in somewhat modified forms is used to determine the distance between a sender and a receiver. In contrast to a radar system where time is measured which is necessary for an electromagnetic wave reflected on the surface of the receiver to cover twice the distance between the sender and the receiver, time needed for the transmission of a first data set from the sender to the receiver and the transmission of a second data set from the receiver back to the sender in a predetermined protocol layer, this means between circuits of a certain protocol layer, is measured. The period of time from the sending of the first data set to the receiving of the second data set is also called Round-Trip-Time (RTT). Generally defined the Round-Trip-Time is the time which is necessary for the data packets in a communication network to travel from a source to a destination and from the destination back to the source. This means that the Round-Trip-Time is the sum of the runtime from a point A to a point B and the runtime from the point B to the point A in the communication network. It may further include in some cases a processing time in the receiver which is however usually small and therefore negligible compared to the runtime.

A data packet used for determining a Round-Trip-Time between a sender and a receiver for example comprises:

separators allowing the determination of the beginning and the end of the data packet (or frame), a source address of the sender and a destination address of the receiver which depend on the protocol layer the sender and the receiver are part of, for example hardware addresses, control information also depending on the protocol layer the sender and the receiver are part of, user data depending on the protocol layer which may for example be simply chosen as random numbers and one or more check sums allowing the detection of transmission errors.

The concept of the Round-Trip-Time is for example used on the layer of the Transmission Control Protocol (TCP) for allowing a sender to detect that an acknowledgement message sent by a receiver of a data packet to acknowledge the reception of the data packet has not been sent. For example, the sender decides that the acknowledgment has not been sent and that the data packet has to be sent again, if the acknowledgement is not received by the sender when a threshold time which is greater than the expected Round-Trip-Time has passed since sending the data packet. This approach allows to adapt the behavior of the circuits of the TCP layer to the current transmission resources, for example in case of changing load. A simple way to determine the average Round-Trip-Time (which may than be used as the expected Round-Trip-Time) is to measure the time difference between the sending of data packet and the receiving of the acknowledgment, repeat this for a plurality of data packets and calculate the average of these time differences.

In case of computer networks, Ping messages are typically not well suited for reliable determination of the Round-Trip-Time between a sender and a receiver due to the fact that for Ping messages ICMP (Internet Control Message Protocol) is used and therefore, Ping messages are routed and prioritized differently than TCP data traffic in many networks. For the comparison of a measured Round-Trip-Time with known scales often frequency normals are used which are oscillators with a high frequency stability, for example quartz crystal oscillators, used for generating a clock signal. Using suitable correction factors, the distance between a sender and a receiver can be determined with high accuracy by measuring the Round-Trip-Time.

Another indirect method for distance measurement is the measurement of the electrical field strengths of a signal received from a sender by a receiver. Also in this case, the distance between the sender and the receiver is not measured itself but a quantity dependent on the distance is measured, namely the strength of the electrical field. However, the electrical field strength of an electromagnetic signal which can be measured at an antenna is strongly time variant and depends on a lot of quantities and factors such that this type of distance measurement is typically far less accurate than the method described above based on the Round-Trip-Time. For the determination of distances from a measured electrical field strength of a signal, mapping tables may be used which comprise values based on experience for the radio technology used for transmitting the signal.

Satellite based navigation systems combine a plurality of methods for distance measuring and are therefore very complex. They are not only suitable for measuring distances, i.e. the relative position between two objects, but also absolute quantities like the position or the speed of an object. Currently, three systems are of global importance:

The Global Positioning System (GPS) which is a satellite based navigation system of the US Department of Defense for global determination of the position of objects. The official denotation is "Navigational Satellite Timing and Ranging—Global Positioning System" (NAVSTAR-GPS). Usually, it is only called GPS and started its operation on Jul. 17, 1995.

The GLONASS (Globalnaja Navigatsionnaja Sputnikovaja Sistema, this means global navigation satellite system) is a satellite based navigation system operated by the Russian Department of Defense. It is similar in its structure and function to the GPS. During the Cold War, it was necessary to construct a navigational system equivalent to the navigational system of the USA.

The European satellite navigation system Galileo, which is scheduled to be operational at the end of 2010. It is based on 30 satellites (27 satellites plus 3 satellites for backup) which orbit the earth in about 23,260 km and comprises a network of ground stations controlling the satellites. Hand receivers with a size of a mobile terminal can use the radio signals sent by the satellites to determine their own position with an accuracy of a few centimeters. Galileo is conceived for civil purposes and is not controlled by national military like GPS or GLONASS.

According to one embodiment of the invention, a radio communication arrangement is provided comprising a plurality of transceivers and a distance measurement managing circuit. The distance measurement managing circuit is situated in a communication layer higher than the physical layer, is coupled with the plurality of transceivers, and controls the plurality of transceivers for measuring the distance of the plurality of transceivers to a specified position. Further, the distance measurement managing circuit receives and processes distance measurement values determined by the plurality of transceivers.

According to another embodiment of the invention, a method for distance measuring according to the radio communication arrangement described above is provided.

Illustratively, a higher-layer circuit is provided for the plurality of transceivers that may work as an interface for the distance measuring functionality of the plurality of transceivers. In this way, it may provide a common interface for other higher-layer (i.e. above physical layer) circuits, for example applications, that want to carry out distance measurements. Further, the distance measurement circuit may process the distance measurements, for example before forwarding them to other higher-layer circuits, e.g. apply correction methods to the measured distance values or calculate an average distance value.

According to another embodiment of the invention, a distance measurement managing circuit is provided that is situated in a communication layer above the physical layer and is accessible by a service access point for determining at least one transceiver of a radio communication device which is to be used for determining the distance of the radio communication device to a specified position.

According to another embodiment of the invention, a method for distance measuring according to the distance measurement circuit described above is provided.

Illustratively, the distance measurement managing circuit may be accessed via the service access point, for example by a circuit of the same communication layer as the one in which the distance measurement circuit is situated or of a communication layer above the communication layer in which the distance measurement circuit is situated, to request from the distance measurement managing circuit to choose at least one from a plurality of transceivers for carrying out a distance measurement.

A circuit can be a hardware circuit designed for the respective functionality or also a programmable processor, programmed for the respective functionality.

A memory used in the embodiments of the invention may be a volatile memory, for example a DRAM (Dynamic Random Access Memory) or a non-volatile memory, for example a PROM (Programmable Read Only Memory), an EPROM (Erasable ROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

For example, the radio communication arrangement comprises a radio communication device comprising the plurality of transceivers. In this case, the distance measurement managing circuit may determine the distance of the radio communication device to the specified position using the distance measurement values.

In one embodiment, the radio communication device comprises the distance measurement managing circuit.

The radio communication device may be part of a mobile communication network and the distance measurement managing circuit may be part of a core network of the mobile communication network.

In one embodiment, the communication layer is the L2CAP layer or the application layer.

For example, the distance measurement managing circuit controls the plurality of transceivers such that at least two transceivers of the plurality of transceivers measure the distance to the specified position simultaneously. The distance measurement managing circuit may process the distance measurement values by determining an average value for at least two distance measurement values. The at least two distance measurement values are for example determined by at least two different transceivers of the plurality of transceivers.

By processing and combining a plurality of distance measurement values instead of using only one distance measurement value, a higher accuracy can be achieved. For example, by combining a plurality of distance measurements or also by applying dynamic correction methods, the distance determination can be made stable against perturbations, e.g. due to interference or noise.

The distance measurement managing circuit may flexibly use the plurality of transceivers to carry out distance measurements. This allows for example to implement power efficient methods for distance measuring and take into account various factors for distance measuring (accuracy, power consumption, speed etc.). The distance measurement managing circuit therefore provides a way to fulfil the requirements by the Bluetooth SIG with respect to the accuracy of distance measuring and with respect to the Core Values defined by the Bluetooth SIG, such as "Low Power".

In one embodiment, the plurality of transceivers are short-range radio transceivers. For example, the plurality of transceivers are Bluetooth transceivers.

The specified position is for example the position of another (set of) transceiver(s), e.g. a (set of) transceiver(s) loacted in another communication terminal. The other (set of) transceiver(s) may be another (set of) short-range radio transceiver(s), for example another Bluetooth transceiver.

In one embodiment, the radio communication arrangement further comprises a distance measurement circuit, the distance measurement managing circuit controls the distance measurement circuit to determine the distance of the distance measurement circuit to the specified position and the distance measurement managing circuit receives and processes distance measurement values determined by the plurality of transceivers and the distance measurement circuit. For example, the distance measurement circuit is a satellite navigation system receiver.

Figure 1:
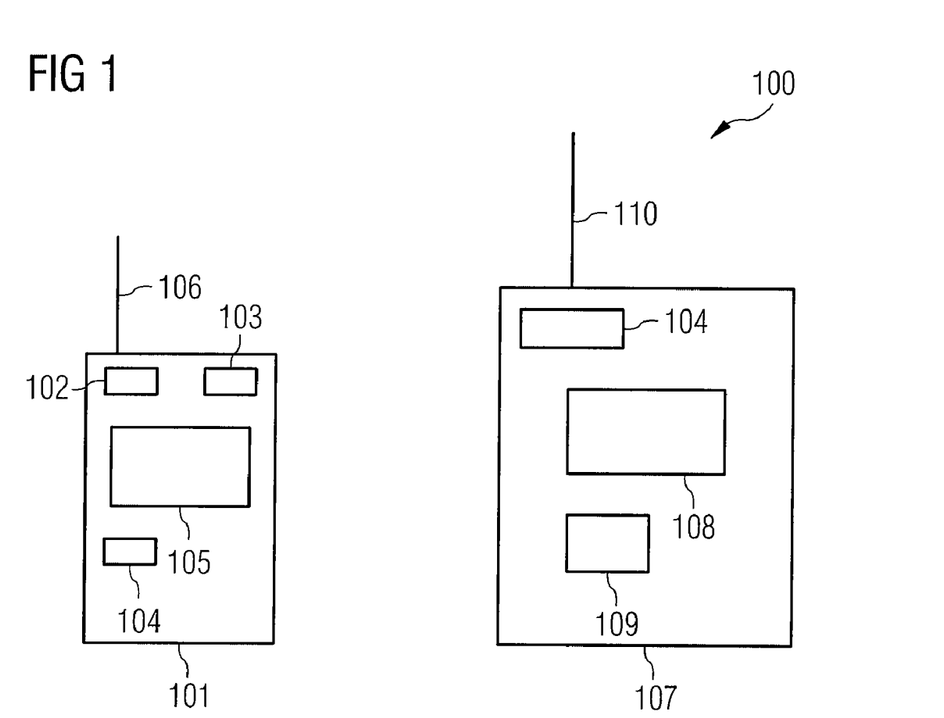
FIG. 1 shows a communication arrangement according to an embodiment of the invention.

FIG. 1 shows a communication arrangement 100 according to an embodiment of the invention.

The communication arrangement comprises a first communication device 101, in this example a mobile communication device, for example a mobile terminal for using a mobile communication system, for example according to the UMTS (Universal Mobile Telecommunications Standard) Standard, the GSM (Global System for Mobile Communications) Standard, the CDMA2000 (CDMA: Code Division Multiple Access) Standard or the FOMA (Freedom for Mobile Access) Standard. The first communication device 101 has a first Bluetooth transceiver 102 and a second Bluetooth transceiver 103 allowing the first communication device 101 to communicate with other communication devices using Bluetooth. The first Bluetooth transceiver 102 and the second Bluetooth transceiver 103 may be configured to communicate using different Bluetooth communication technologies, for example using different Bluetooth physical layers. For example, the first transceiver 102 allows the first communication device 101 to communicate using Legacy Bluetooth and the second Bluetooth transceiver 103 allows the first communication device 101 to communicate using the Ultra Wideband (UWB). The first communication device 101 further comprises other components for providing communication functions, for example a first processor 104, a display 105 and a first antenna 106.

The communication arrangement 100 further comprises a second communication device 107, in this example a stationary communication device, for example a personal computer (PC) or an access point or router to a stationary telecommunications network or a computer network. The second communication device 107 comprises a third Bluetooth transceiver 104 allowing the second communication device 107 to communicate using Bluetooth. The second communication device may also comprise further Bluetooth transceivers similar to the first communication device 101 and in this example comprises other components like a memory 108, a second processor 109 and a second antenna 110.

For the sake of better understanding of the exemplary embodiments of the invention, the text which follows explains the ISO/OSI model, which represents a reference model for the description of manufacturer-independent communication systems which is standardized by the international organization for standardization (ISO) and is composed of seven layers. OSI means open system interconnection (open system for communication links).

The ISO/OSI model is used as an aid for describing open communication between different network communication devices from different manufacturers. A large number of freely usable network communication protocols are based on this reference model, a known example being the transport control protocol/Internet protocol (TCP/IP). The seven levels, in other words the seven communication protocol layers, are defined in such a way that they build on one another and each individual level can be used independently of the other levels.

The communication protocol layers which are defined by the OSI can be divided into two main groups: the communication protocol layers 1 to 4 constitute the transport system in which the communication channels are defined physically and logically. The levels, in other words the communication protocol layers, 5 to 7 constitute the application system and serve predominantly for representing information. The communication protocol layers are usually illustrated in such a way that the communication protocol layer 1 (physical layer) is represented graphically at the bottom and the communication protocol layer 7 (application layer) at the top (cf. Table 1):

TABLE 1

| No. | English term | Examples |
| --- | --- | --- |
| 7 | Application layer | Web browser, mail program |
| 6 | Presentation layer | HTML, XML, MIME |
| 5 | Session layer | http, FTP, POP3, SMTP |
| 4 | Transport layer | TCP |
| 3 | Network layer | IP |
| 2 | Data link layer | PPP |
| 1 | Physical layer | IEEE 802 |

In the text which follows, a number of main tasks of the respective communication protocol layers are described.

Communication protocol layer 7 (application layer): The application layer produces the communication link between the user and one or more application programs, for example an e-mail application program or a data transmission application program, etc.

Communication protocol layer 6 (presentation layer): Data for the application layer are prepared in the presentation layer. The data is usually decoded, converted, encrypted or checked.

Communication protocol layer 5 (session layer): Services which serve to organize the transmission of data are prepared by means of the session layer. For example, communication links can be resumed again despite an intermediate interruption; to do this, for example, what are referred to as tokens are correspondingly inserted into the data packets.

Communication protocol layer 4 (transport layer): The transport layer provides the possibility of setting up and releasing communication links in an orderly way, of synchronizing communication links with one another and of distributing data packets along a plurality of communication links (also referred to as multiplexing). The transport layer connects the transport system to the application system of the ISO/OSI model (see above). Furthermore, data packets are segmented and packet congestion is prevented.

Communication protocol layer 3 (network layer): The network layer performs the switching and delivery of data packets. The compilation of routing tables and the routing per se also take place in the network layer. Packets which are to be forwarded are given a new intermediate destination address and do not penetrate into higher communication protocol layers. The connection between different network topologies is also made at this level, i.e. in this communication protocol layer.

Communication protocol layer 2 (data link layer): The data link layer organizes and monitors access to the transmission medium. The bit stream is segmented at the level of the data link layer and assembled into packets. Furthermore, data can be subjected to error checking, for example a checksum can be appended to a packet. It is also possible to compress the data in this communication protocol layer. Further components of the data link layer are sequence monitoring and monitoring of timing as well as flow control.

The data link layer can be divided once more into two sublayers. The "upper" sublayer is referred to as the logical link control sublayer (LLC layer) and the "lower" sublayer is referred to as the medium access control sublayer (MAC layer). The functionalities of the MAC layer can be expressed in different ways depending on the transmission medium (physical layer) used.

Their main functions usually include:
Detecting where data packets (frames) start and stop in the bit stream received from the physical layer (when data packets are received).
Dividing the data stream into data packets (frames) and possibly inserting additional bits into the data packet structure so that the start and the end of data packet can be detected in the receiver (when data packets are sent).
Detecting transmission errors, for example as a result of the insertion of a checksum during transmission or by means of corresponding control calculations during reception.
Insertion or evaluation of MAC addresses in the transmitter or receiver.
Access control, i.e. control to determine which of the communication devices accessing the physical medium has the right to transmit.

Communication protocol layer 1 (physical layer): Plug-in connections, wavelengths and signal levels are defined in the physical layer. The bit sequences are converted into transmissible formats in this communication protocol layer. The properties of the transmission media (cable, radio, optical waveguides) are also defined in the physical layer.

The interface between a communication layer, e.g. a layer of the ISO/OSI model, to another communication layer is called Service Access Point (SAP). An SAP allows the communication between the two communication layers. This is illustrated in FIG. 2.

Figure 2:
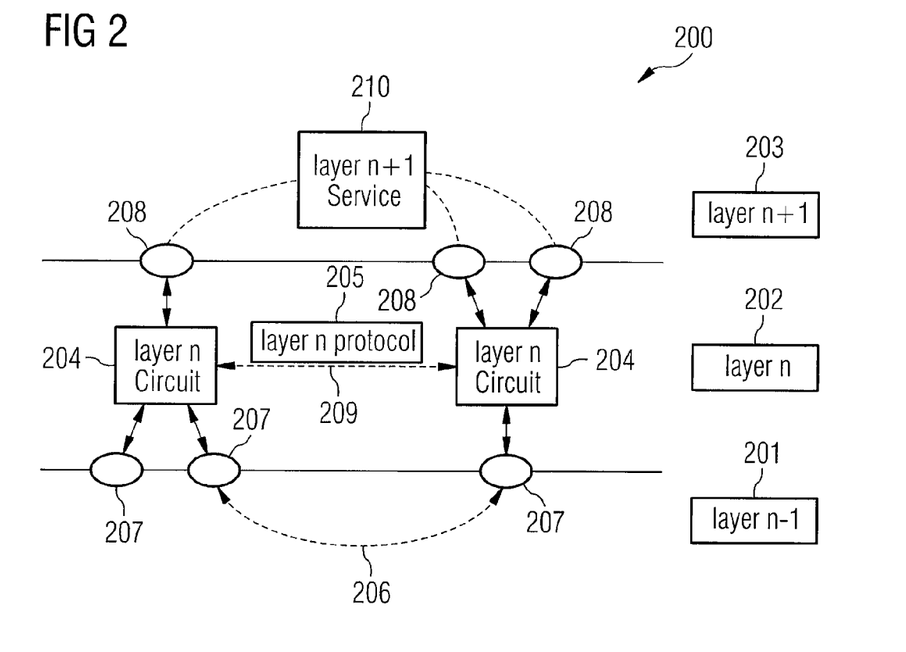
FIG. 2 shows a protocol layer arrangement.

FIG. 2 shows a protocol layer arrangement 200.

The protocol layer arrangement comprises an (n−1)th layer 201, an nth layer 202 and an (n+1)th layer 203. For example, in case of the ISO/OSI layer model, n is between 1 and 7 wherein if n=1, there is no (n−1)th layer 201 and if n=7, there is no (n+1)th layer 203. The nth layer 202 is above the (n−1)th layer 201 and the (n+1) 203 is above the nth layer 202. Thereby, above means nearer to the application layer or farther away from the physical layer. If a first layer is above a second layer it is also said that the first layer is higher than the second layer. Correspondingly, it is said that the second layer is below the first layer or lower than the first layer.

The nth layer 202 comprises nth layer circuits 204 which provide the functions of the nth layer 202. The nth layer circuits 204 of the nth layer 202 may be instances of objects of the nth layer 202. The nth layer circuits 204 communicate with each other using the nth layer protocol 205. The nth layer circuits 204 may be for example in different communication devices. For example, if the nth layer 202 is the TCP layer, one of the nth layer objects 204 may be a circuit of the TCP protocol layer in one communication device, and the other nth layer circuit 204 may be a circuit of the TCP protocol layer in another communication device and the two nth layer circuits 204 communicate with each other using TCP protocol as nth layer protocol 205.

Each layer 201, 202, 203 fulfils specific functions and (except for the uppermost layer) offers its services to the layer above. In this example the (n−1)th layer 201 offers a communication link 206 (provided according to (n−1)th layer protocol) to the nth layer 202, which the nth layer circuits 204 may use to communicate with each other. For example if the (n−1)th layer 201 is IP layer the communication link 206 is an IP communication connection which may be used by the TCP layer above (nth layer).

The services offered by a layer can be used by the layer above via Service Access Points. In this example, there exist first Service Access Points 207 of the (n−1)th layer 201 via which the (n−1)th layer 201 offers its services to the nth layer 202 and second Service Access Points 208 of the nth layer 202 via which the nth layer 202 offers its services to the (n+1)th layer 203, for example a nth layer communication link 209, e.g. a TCP connection which may for example be used by a communication service 210 of the (n+1)th layer 203.

For the communication between a layer and the layer below so called data elements (also called Primitives) are used by which for example a layer can send requests to the layer below or can receive data from the layer below.

In practice, a layer can provide a plurality of identical or different services simultaneously, for example when a communication device has a plurality of communication connections to other communication devices. For this, a layer may have more than one Service Access Points. In a lot of protocols, the Service Access Points of a layer are defined by numbers, names or similar to allow identification of the Service Access Points. For example, a so called Service Access Point Identifier (SAPI) is used.

A layer may address a service provided by the layer below via an SAP using its SAPI. This for example guarantees that a request of a layer can be associated with the communication link provided by the layer below for which it is intended.

Figure 3:
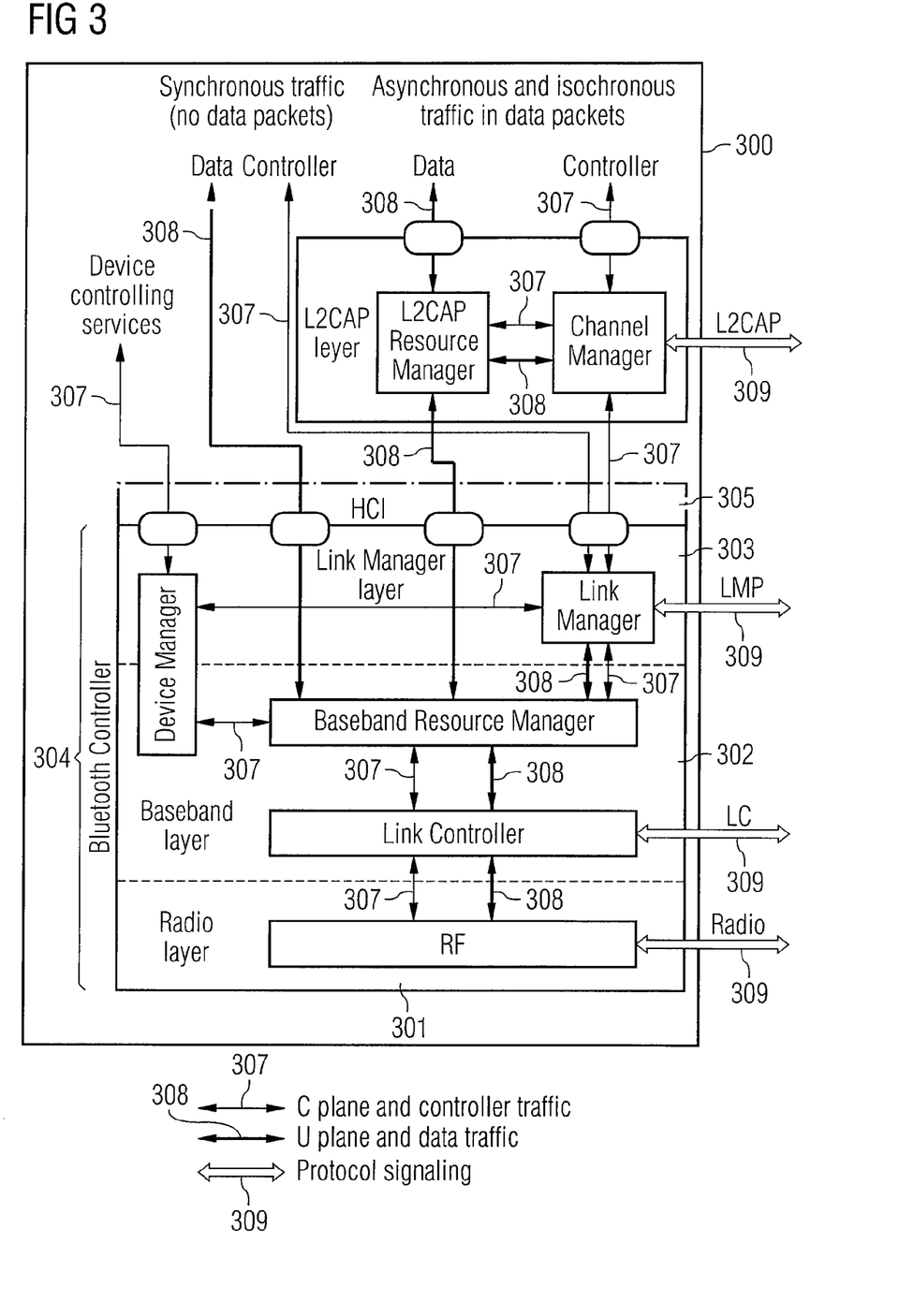
FIG. 3 shows a protocol layer diagram.

The lower protocol layers of the Bluetooth architecture according to one exemplary embodiment of the invention are illustrated in FIG. 3 in a protocol layer diagram 300.

The three lower communication protocol layers (physical layer, also referred to as radio layer 301 according to Bluetooth; data link layer, also referred to as baseband layer 302 according to Bluetooth, and the network layer, also referred to as link management layer 303 according to Bluetooth) are combined according to this exemplary embodiment of the invention to form a subsystem 304, which is also referred to as "Bluetooth controller".

The transport layer above the Bluetooth controller 304 is terminated according to Bluetooth by the optional "host to controller interface" (HCI) 305 which is shown in FIG. 3. The HCI interface 305 serves as a service access point to the Bluetooth controller 304 in the Bluetooth architecture according to the exemplary embodiments of the invention.

Above the HCI interface 305 a session layer which is referred to as a logical link control and adaptation protocol layer 306 (L2CAP layer) is provided. The L2CAP layer 306 is used, according to the exemplary embodiments of the invention, in ACL communication links but it is not used for SCO communication links which are aimed at ensuring an efficient voice transmission with a constant data rate of usually 64 kbit/s. According to the illustrated Bluetooth architecture, the strict division of the ISO/OSI model is not always complied with.

In the general Bluetooth architecture such as is provided according to the exemplary embodiments of the invention, parts of the network layer 303 also extend into the data link layer 302. The presentation layer and the application layer are not shown in FIG. 3 for reasons of simpler illustration. Control signals 307 are represented in FIG. 3 by thin connecting arrows and form the control plane (C plane) while the data signals 308 are represented by thicker connecting arrows in FIG. 3, the data signals forming the user plane (U plane).

Interoperability in Bluetooth is ensured by the fact that on the one hand a clean interface is defined between the Bluetooth controller 304 (communication protocol layers extending downwards from the link management layer 303) and the "Bluetooth host" (the layers extending upwards from the L2CAP layer 306) within a Bluetooth communication system (specifically the HCI interface 305), and, on the other hand, the exchange of protocol messages between identical layers of two different Bluetooth communication systems is regulated unambiguously, symbolized in FIG. 3 by means of communication connecting arrows 309.

The Bluetooth SIG (Special Interest Group) has decided in early 2006 to incorporate, in addition to the conventional Bluetooth radio technology which provides data rates of up to 2.2 Mbit/s (for download according to Bluetooth version 2.0+Enhanced Data Rate), other radio technologies which provide higher data rates of over 100 Mbit/s into the existing Bluetooth architecture. A transceiver for another radio technology to be incorporated is denoted by AMP (Alternate MAC/PHY) by the Bluetooth SIG and includes the circuits of the physical layer (layer 1, PHY) and the data link layer (layer 2, MAC) of the radio technology. Possibly, the transceiver also comprises circuits of a so called Protocol Adaptation Layer (PAL) which is above the MAC layer and simplifies the interfacing of the transceiver (also called controller) with the circuits of the higher layers (also called host).

In the first instance, a radio technology based on OFDM (Orthogonal Frequency Division Multiplexing) and UWB (Ultra Wideband) according the standards of the WiMedia Alliance should be integrated into the existing Bluetooth architecture. Examples for radio technologies based on OFDM are Digital Video Broadcasting (DVB), Digital Audio Broadcasting (DAB), x Digital Subscriber Line (xDSL) and Power Line Communications (PLC). Later, other radio technologies may be incorporated into the Bluetooth architecture. For example, WLAN (Wireless Local Area Network) according to IEEE 802.11b/g is discussed as a second possible radio technology candidate for integration.

In one embodiment, the first communication device 101 and/or the second communication device 110 comprises a transceiver (as mentioned above also denoted by controller according to Bluetooth terminology) which implements a radio technology using the UWB for transmission, for example the radio technology based on OFDM and the UWB according to the WiMedia Alliance. The logical structure of this transceiver is shown in FIG. 4.

Figure 4:
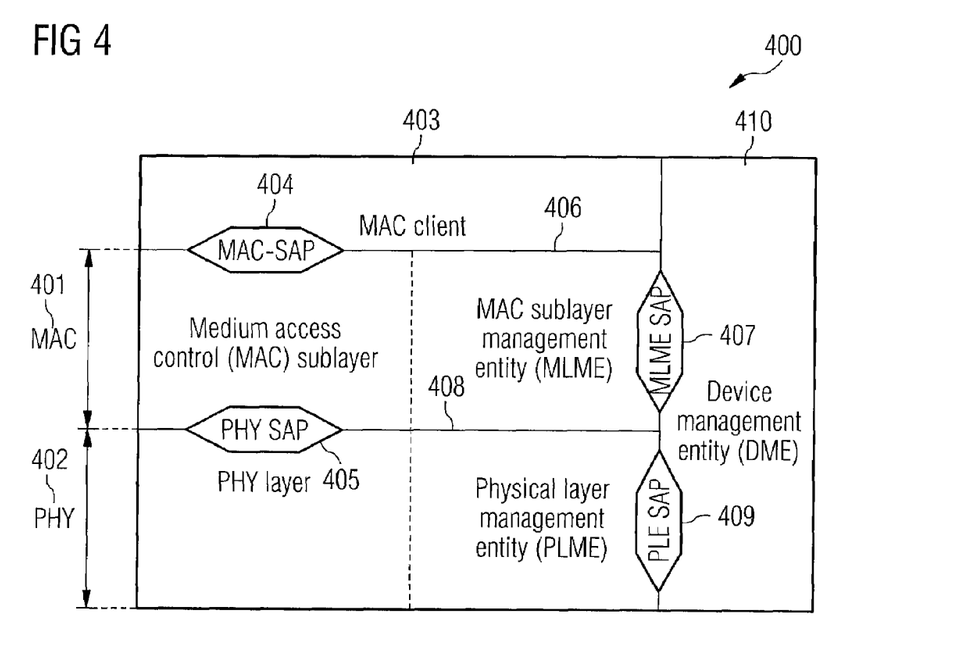
FIG. 4 shows a transceiver according to one embodiment of the invention.

FIG. 4 shows a transceiver 400 according to one embodiment of the invention.

The transceiver 400 comprises circuits of a MAC layer 401 and a PHY layer 402. The services provided by the MAC layer 401 are used by circuits of upper layers, for example applications, which are denoted as MAC client 403. The MAC client 403 uses services provided by the MAC layer 401 via a MAC Service Access Point (MAC SAP) 404. The MAC layer 401 uses the services provided by the PHY layer 402 (physical layer) via a PHY Service Access Point (PHY SAP) 405. The Service Access Points 404, 405 are only logical interfaces. They do not need to be implemented according to certain rules and do not have to be visible for circuits that are not part of the transceiver 400. As mentioned above, so called Primitives (service elements) are used for communication via the Services Access Points 404, 405, for example to specify requested services.

The MAC layer 401 comprises a logical controlling and managing circuit MLME 406 (MAC Layer Management Entity) which has an interface for controlling the functionality of the MAC layer 401, which is represented by the dotted line in the MAC layer 401 for reasons of simpler illustration. Similarly, the PHY layer 402 comprises a logical controlling and managing circuit PLME 408 (PHY Layer Management Entity) which has an interface for controlling the functionality of the PHY layer 402, which is represented by the dotted line in the PHY layer 402 for reasons of simpler illustration. For the controlling and management of the transceiver 400 there are also inter-layer controlling and managing circuits in a so called DME (Device Management Entity) 410. The DME 410 may communicate with the MLME 406 via an MLME SAP 407 and communicate with the PLME 408 via an PLME SAP 409. The behavior of the DME 410 is currently not defined in the standard of the WiMedia Alliance. The DME 410 for example collects layer specific status information from the MLME 406 and the PLME 408 and sets layer specific parameters in the MAC layer 401 and the PHY layer 402. The MLME 406 and the PLME 408 offer the DME 410 controlling and managing services via the MLME SAP 407 and the PLME SAP 409, respectively.

ECMA-368 defines a method for initiating a distance measurements in an UWB transceiver; this method may also be used when the UWB transceiver is integrated as an AMP in the Bluetooth architecture, this means when it is an alternate Bluetooth transceiver using the UWB for transmission, for example according to the specifications of the WiMedia Alliance. For initiating a distance measurement, the DME 410 transmits a message (service element) of the type MLME-RANGE-MEASUREMENT.request (which is a MLME SAP Primitive) via the MLME SAP 407 to the MAC layer 401. The message comprises a first parameter denoted by DestEUI which identifies the communication device from which the distance should be measured. Further, the message comprises a second parameter denoted by RMN which comprises an integer value that specifies the number of measurement values that should be collected by successive runtime measurements.

With a message of the type MLME-RANGE-MEASUREMENT.confirm (which is also a MLME SAP Primitive) the MLME 406 can inform the DME about the results of a distance measurement. This message comprises three parameters: Results, MeasurementResultSet and MeasurementResultSetCount which hold the results of the distance measurement. According to ECMA-368 a further message (service element) of the type MLME-RANGE-MEASUREMENT.indication is defined which is also a MLME SAP Primitive and which allows the MLME 406 of a communication device for which the distance is measured to inform the respective DME 410 that a distance measurement is carried out. For this, two parameters can be transmitted to the DME 410. A parameter denoted SrcEUI comprises an identification of the communication device carrying out the distance measurement and a second parameter denoted by RMN as above specifies the number of measurement values to be collected. The MAC layer 401 and the PHY layer 402 communicate in course of a distance measurement using the following service elements (PHY SAP Primitive):

PLME-RANGING-TIMER-START.request which allows switching on the distance measurement in the PHY layer 402, PLME-RANGING-TIMER-START.confirm which allows acknowledging to the MAC layer 401 that the distance measurement was switched on in the PHY layer 402, PLME-RANGING-TIMER-END.request that allows switching off the distance measurement in the PHY layer 402 by the MAC layer 401 and PLME-RANGING-TIMER-END.confirm which allows acknowledging to the MAC layer 401 that the distance measurement was switched off.

When the value of the parameter RMN set by the DME 410 is greater than 1, the MAC layer 401 and the PHY layer 402 determine a plurality of measurement values from which a plurality of successive Round-Trip-Times can be calculated. By using certain algorithms, for example calculating an average value over a plurality of measurements, a high accuracy of the distance determination may be achieved.

In one embodiment, as shown in FIG. 1, the first communication device comprises a plurality of transceivers 102, 103. It is assumed that both the first transceiver 102 and the second transceiver 103 provide the functionality of distance measurements. In one embodiment, a central distance measurement circuit is provided that offers the circuits of the session layer (layer 5) the possibility to carry out distance measurements using the first transceiver 102 or the second transceiver 103. This distance measurement functionality can be accessed by the circuits of the session layer via a central Ranging Service Access Points (Ranging SAP) provided by the distance measurement circuit. This allows the circuits of the session layer to carry out distance measurements using any of the transceivers 102, 103 of the first communication device 101 using only one Service Access Point, namely the Ranging Service Access Point, without the need to be able to communicate with each transceiver 102, 103 via an individual Service Access Point with an individual command set. The circuits of the session layer need only to be able to communicate via the central Ranging SAP of the distance measurement circuit using only one set of service elements (Primitives).

The logical structure of a communication device 101, 107 comprising a plurality of transceivers and a central distance measurement circuit is explained in the following with reference to FIG. 5.

Figure 5:
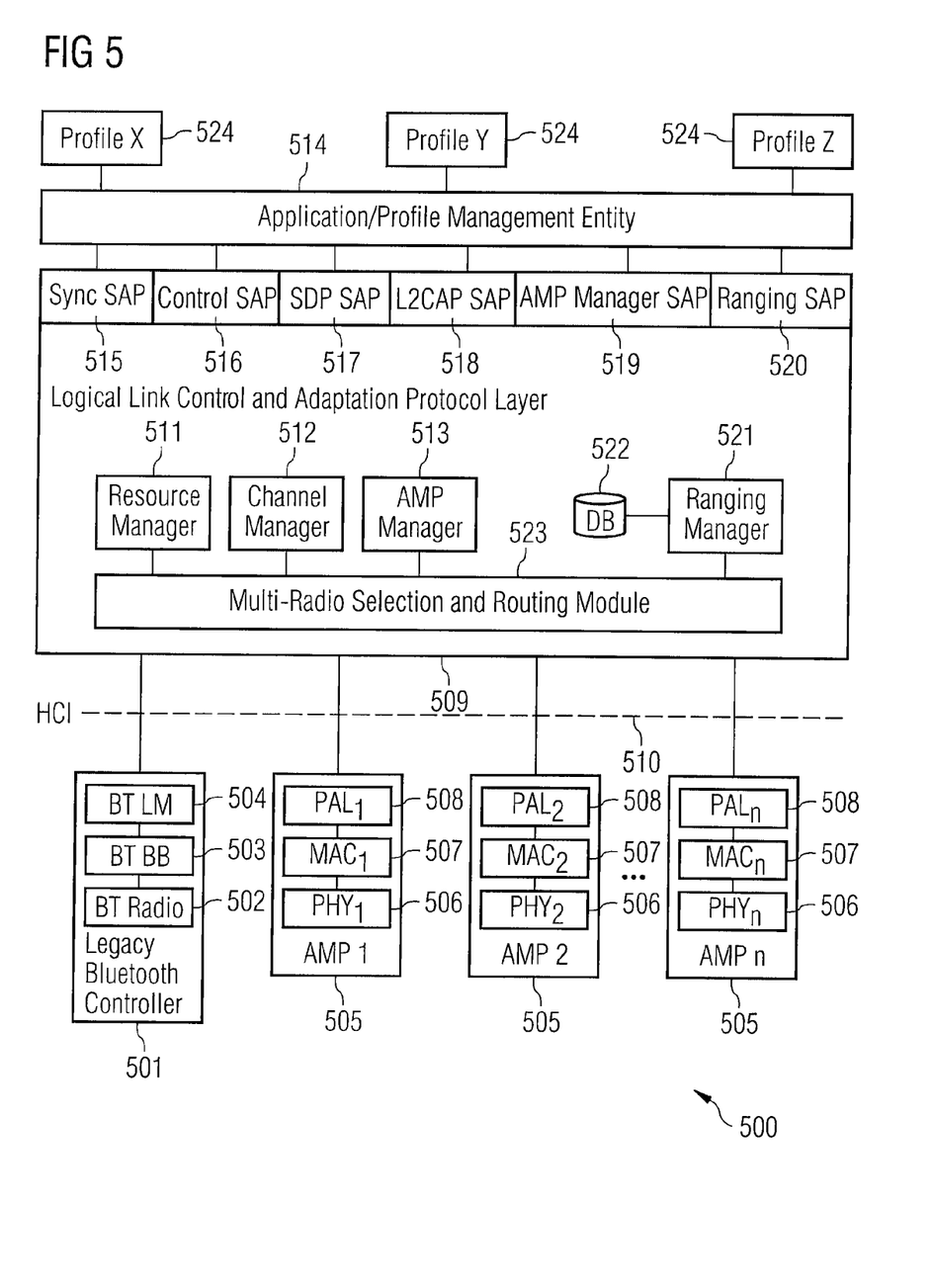
FIG. 5 shows a communication device according to an embodiment of the invention.

FIG. 5 shows a communication device 500 according to an embodiment of the invention.

The communication device 500 comprises a conventional Legacy Bluetooth Controller 501. The Legacy Bluetooth Controller 501 comprises a Bluetooth Radio Circuit 502, a Bluetooth Baseband Circuit 503 and a Bluetooth Link Management Circuit 504 which provide the functionality of the Legacy Bluetooth Radio Technology.

The communication device 500 further comprises a plurality of AMPs 505 each comprising a Physical Layer 506, a MAC layer 507 and (optionally) a Protocol Adaptation Layer (PAL) 508. Each of the AMPs 505 provides the functionality of a transceiver, this means the functionality of the MAC layer and the Physical Layer of a radio technology, for example the radio technology using Ultra Wideband according to WiMedia Alliance. The AMPs 505 and the Bluetooth transceiver are coupled to a Logical Link Control and Adaptation Protocol Layer 509 via a Host Controller Interface (HCI) 510. The circuits of the PAL layer 508 serve for the adaptation of the data to the requirements of the HCI 510. However, as mentioned above, the PAL layers 508 are optional. The Legacy Bluetooth Controller 501 that uses the conventional Bluetooth radio technology operating at about 2.4 GHz does not comprise a PAL, since the HCI 510 is designed for the conventional Bluetooth controller 501. The Logical Link Control and Adaptation Protocol Layer (L2CAP) 509 comprises a Resource Manager 511 and a Channel Manager 512. The L2CAP layer 509 may further comprise an AMP Manager 513. The AMP Manger is currently being discussed in course of the incorporation of a radio technology using UWB into the Bluetooth architecture.

The Logical Link Control and Adaptation Protocol Layer 509 offers its functionalities to higher layers, in this case an Application/Profile Management Entity 514 via various Service Access Points, a Synch SAP 515, a Control SAP 516, a SDP SAP 517, a L2CAP SAP 518, and an AMP Manger SAP 519. The AMP Manger SAP 519 corresponds to the AMP Manager 513 and is currently not fully specified in the Bluetooth standard.

The Logical Link Control and Adaptation Protocol Layer 509 further comprises a central distance measuring circuit in the form of a Ranging Manager 521 and a Data Base 522 (memory) which may be accessed by the Ranging Manager 521 and may be used by the Ranging Manager 521 to store data and load data stored therein.

The Logical Link Control and Adaptation Protocol Layer 509 further offers its functionalities to higher layers, in this case an Application/Profile Management Entity 514 via a Ranging SAP 520. The Ranging SAP 520 corresponds to the Ranging Manager 521 according to this invention.

The Resource Manager 511, the Channel Manager 512, the AMP Manager 513 and the Ranging Manager 521 communicate with the Legacy Bluetooth Controller 501 and the AMPs 505 via a Multi-Radio Selection and Routing Module 523 which for example routes data traffic from and to the correct transceiver 501, 505 and is used for selecting a transceiver 501, 505 for communication with other communication devices. The Application/Profile Management Entity 514 may provide its functionalities according to various Bluetooth profiles 524.

The Ranging Manager 521 provides its functionalities to the Application/Profile Management Entity 514 via the Ranging SAP 520, namely functions to perform distance measurements using the transceivers 501, 505. The Ranging Manager 521 receives service elements (Primitives) from the Application/Profile Management Entity 514 which for example specify requests for carrying out distance measurements, coordinates one or more measurements in the transceivers 501, 505, this means the Legacy Bluetooth Controller 501 or the various AMPs 505 according to their technical capabilities and according to the requests of the Application/Profile Management Entity 514, optionally processes the results of the distance measurements, for example calculates average values over plurality of distance measurements carried out by one of the transceivers 501, 505, and provides the results of the distance measurements or processing of the distance measurements to the Application/Profile Management Entity 514 via the Ranging SAP 520.

In another embodiment of the invention, the L2CAP SAP 518 is extended by the functionality of the AMP Manager SAP 519 and the Ranging SAP 520. This is shown in FIG. 6.

Figure 6:
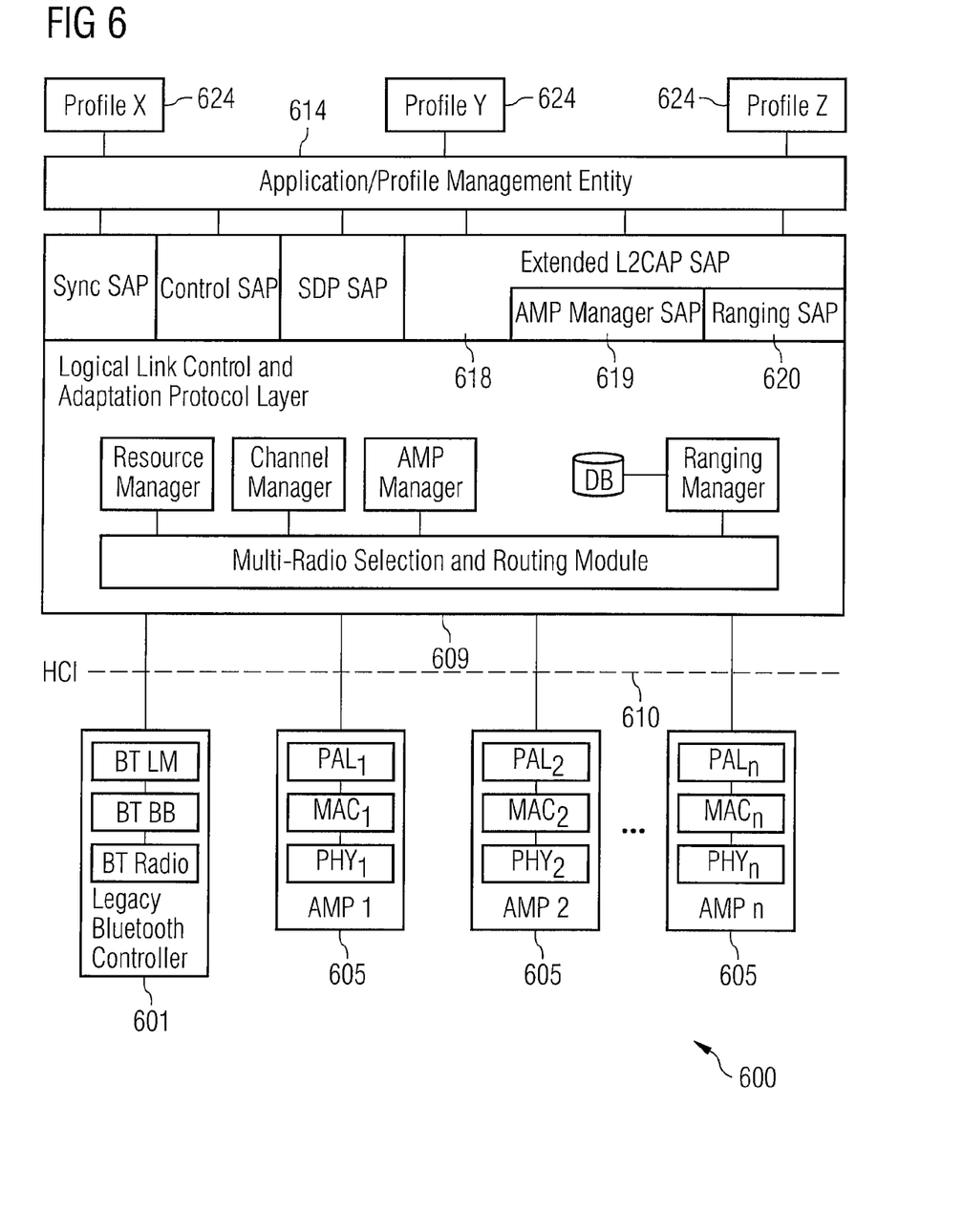
FIG. 6 shows a communication device according to an embodiment of the invention.

FIG. 6 shows a communication device 600 according to an embodiment of the invention. Similar to the communication device 500 shown in FIG. 5, the communication device 600 comprises a Legacy Bluetooth Controller 601, AMPs 605, a Logical Link Control and Adaptation Protocol Layer 609, an HCI 610, an Application/Profile Management Entity 614 and profiles 624.

In addition to the communication device 500 shown in FIG. 5, the communication device comprises an extended L2CAP SAP 618 which is an extension of the L2CAP SAP 518 and comprises the functionality of an AMP Manager SAP 619 and a Ranging SAP 620.

The service elements (Primitives) which are related to the functionality of the AMP Manager SAP 619 or the Ranging SAP 620 are forwarded to the respective circuits of the extended L2CAP SAP 618. Accordingly, the SAPI for addressing the Service Access Points is changed compared to the communication device 500 shown in FIG. 5. The structure of the Ranging SAP service elements (Primitive) and the parameters signaled by the Ranging SAP service elements do not have to be changed with respect to the architecture shown in FIG. 5.

In another embodiment, the PAL 508 are each divided in an upper PAL (U-PAL) which is part of the Logical Link Control and Adaptation Protocol Layer 509, 609 and a lower PAL (L-PAL) which is located, similar to the PAL 508 and the respective AMPs 505, 605. This means that part of the functionality of the PAL 508 is located in the Logical Link Control and Adaptation Protocol Layer 509 as upper PAL and the lower PAL of an AMP 505 communicates with the Multi-Radio Selection and Routing Module 523 via the upper PAL. The Ranging Manager 521 can similarly be implemented in case of the architecture comprising an upper PAL and a lower PAL.

Figure 7:
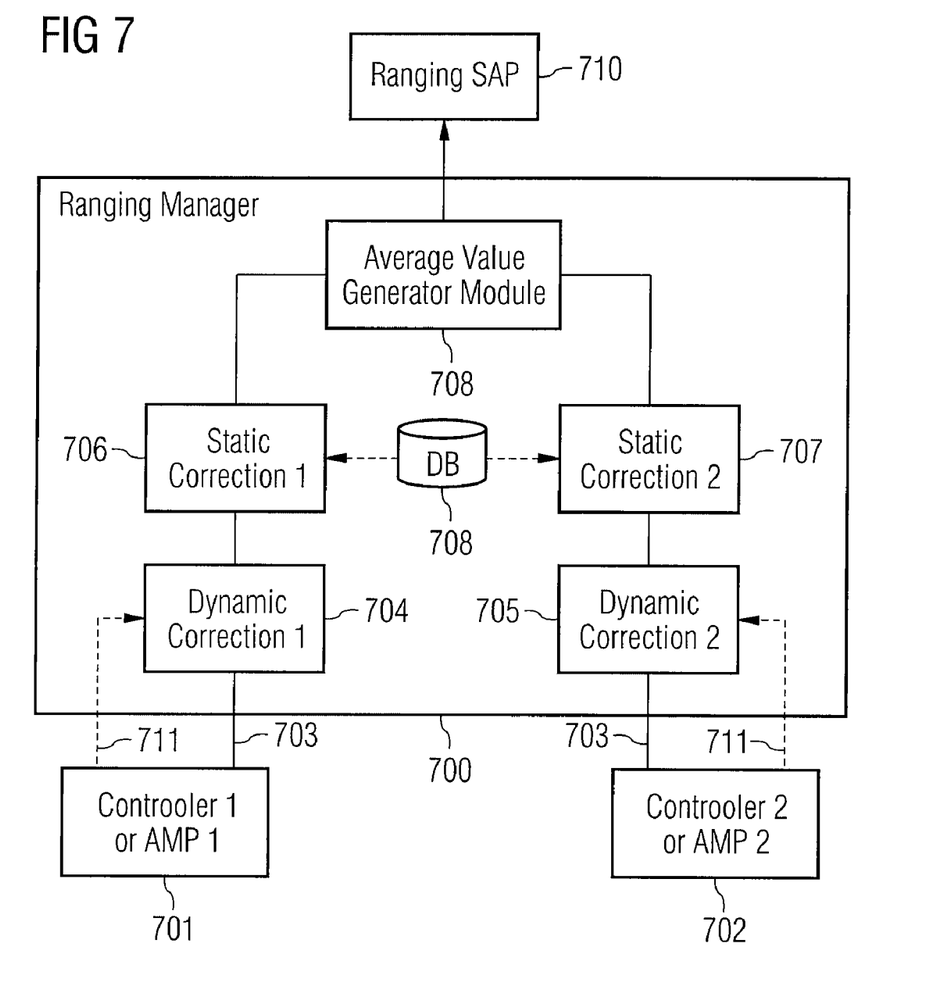
FIG. 7 shows a Ranging Manager according to an embodiment of the invention.

The structure of a Ranging Manager 521 for taking into account static and dynamic correction factors is shown in FIG. 7.

FIG. 7 shows a Ranging Manager 700 according to an embodiment of the invention. In this example, the Ranging Manager 700 is coupled with two transceivers 701, 702, a first transceiver 701 and a second transceiver 702. The first transceiver 701 and similarly the second transceiver 702 may be a Legacy Bluetooth Controller or an AMP. The transceivers 701, 702 transmit measurement values (indicated by solid lines 703) to the Ranging Manager 700. A measurement value is for example a Round-Trip-Time determined by a transceiver 701, 702 or also two time points (trigger points) from which a Round-Trip-Time can be calculated. Further, the transceivers 701, 702 transmit control information (indicated by dashed lines 711) to the Ranging Manager 700. The control information for example specifies the reliability of a measurement value or gives an estimate of the reliability of a measurement value. A first dynamic correction circuit 704 adapts the measurement values to the circumstances, for example based on the control information. For example, the first dynamic correction circuit 704 weighs measurement values based on their reliability as specified by control information. Similarly, a second dynamic correction circuit 705 dynamically corrects and adapts the measurement values transmitted from the second transceiver 702, for example weighs the measurement values transmitted from the second transceiver based on their reliability. The measurement values (possibly dynamically corrected by the first dynamic correction circuit 704 and the second dynamic correction circuit 705) may than be statically corrected by a first static correction circuit 706 and a second static correction circuit 707, respectively. For this, the first static correction circuit 706 and the second static correction circuit 707 may access a data base 708 to get statistical correction factors stored in the data base 708. The data base 708 for example corresponds to the data base 522 of the communication device 500 and is accessible by the Ranging Manager 700 for storing and reading data. In this example, the data base 708 is integrated in the Ranging Manager 700.

The corrected measurement values from the two paths, i.e. from the first transceiver 701, possibly corrected by the first dynamic correction circuit 704 and the first static correction circuit 706 and from the second transceiver 702, possibly corrected by the second dynamic correction circuit 705 and the second static correction circuit 707 are both fed into an Average Value Generator Module 708 which calculates an average value over a plurality of measurement values. For example, the Average Value Generator Module 709 averages a measurement value generated by the first transceiver 701 and a measurement value generated by the second transceiver 702 arithmetically or it averages a plurality of measurement values generated successively by one of the transceivers 701, 702 geometrically. The type of averaging performed by the Average Value Generator Module 709 may depend of requirements of the applications and profiles which are signaled to the Ranging Manager 700 via the Ranging SAP 710 in the form of Ranging SAP service elements (Primitives). By selecting the number of measurements which are averaged and/or by selecting the type of dynamic/static correction, the accuracy of the distance determination can be set to the current requirement.

Table 2 lists possible information elements which may be used in the service element Ranging_Request transmitted from an application (or a profile) to the Ranging Manager 700.

TABLE 2

| Information Element | Presence | Description |
| --- | --- | --- |
| message type | mandatory | identifies the service element as Ranging_Request |
| SAPI | mandatory | identifies the service access point |
| transaction identification | mandatory | application-specific or profile-specific identification of this transaction |
| version index | optional | allows the indication of a version number |
| receiver ID | mandatory | identifies the ranging manager |
| sender ID | mandatory | identifies the requesting application or the requesting profile |
| dynamical correction | optional | allows to switch on and switch off the dynamical correction |
| static correction | optional | allows to switch on and switch off the static correction |
| averaging method | optional | identifies the desired mathematical method for averaging |
| general parameters | optional | e.g. specification of accuracy, speed, energy saving etc. |
| result format | optional | allows the specification of the desired format for the transfer of the results |

Table 3 list possible information elements in the service element Ranging_Confirm transmitted from the Ranging Manager 700 to an application (or a profile). The service elements and information elements according to tables 2 and 3 may also be used in the case that Ranging SAP is integrated in an extended L2CAP SAP as shown in FIG. 6. For this, the SAPI may be chosen suitably or the name of the service element may be changed to fit this architecture.

TABLE 3

| Information element | Presence | Description |
| --- | --- | --- |
| message type | mandatory | identifies the service element as Ranging_Confirm |
| SAPI | mandatory | identifies the service access point |
| transaction identification | mandatory | application-specific or profile-specific identification of this transaction |
| version index | optional | allows the indication of a version number |
| receiver ID | mandatory | identifies the ranging manager |
| sender ID | mandatory | identifies the requesting application or the requesting profile |
| result | Optional | result values, e.g. in form of a list |
| status | Optional | specifies whether the request could be carried out as desired; mayfor example comprise an error code |

As mentioned above, one of the communication devices depicted in FIG. 1 may be a stationary communication device, such as an access point (e.g., an WLAN access point according to 802.11b/g) and may have a router included. It may be connected to a (wired) telecommunications network or to a (wired) computer network. In another embodiment of the invention a ranging manager (also called distance measurement managing circuit) is located in the core network of a mobile communication system as is explained in the following with reference to FIG. 8.

Figure 8:
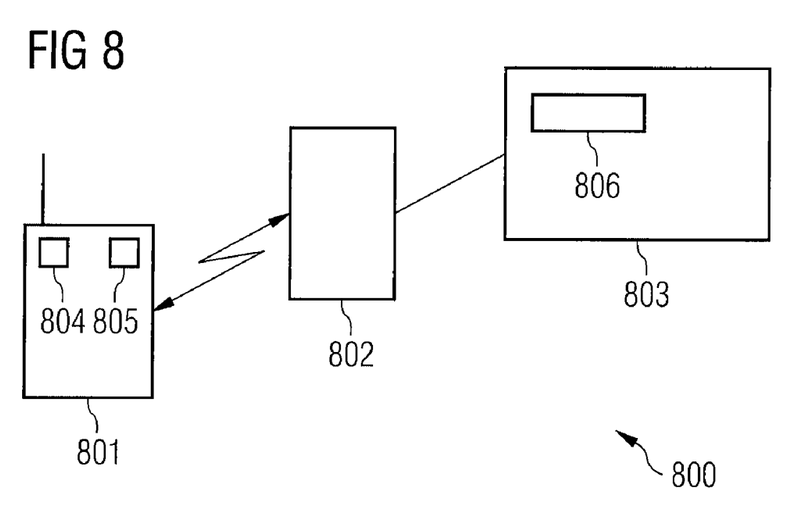
FIG. 8 shows a communication system according to an embodiment of the invention.

FIG. 8 shows a communication system 800 according to an embodiment of the invention.

The communication system 800 comprises a mobile terminal 801 which may communicate which a base station 802 of a mobile communication network using a first transceiver 804 or a second transceiver 805. In this example, the first transceiver 804 and the second transceiver 805 use different frequency bands for communication.

The base station 802 is coupled to a core network 803 of the mobile communication network. The mobile communication network is a cellular network for example according to GSM, UMTS, FOMA or CDMA2000.

The core network 803 comprises a ranging manager 806 which may send requests to the mobile terminal 801 to carry out distance measurements (for example to another mobile terminal) using the transceivers 804, 805. For example, the ranging manager 806 requests that both the first transceiver 804 and the second transceiver 805 generate distance measurements (using different frequency bands) which are sent to the ranging manager 806 by the mobile terminal 801 and are processed by the ranging manager 806, for example averaged, as explained above.

Figure 9:
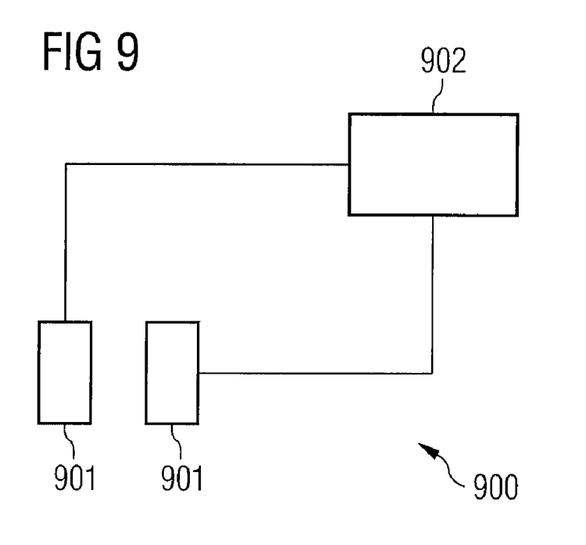
FIG. 9 shows a radio communication arrangement according to an embodiment of the invention.
Figure 10:
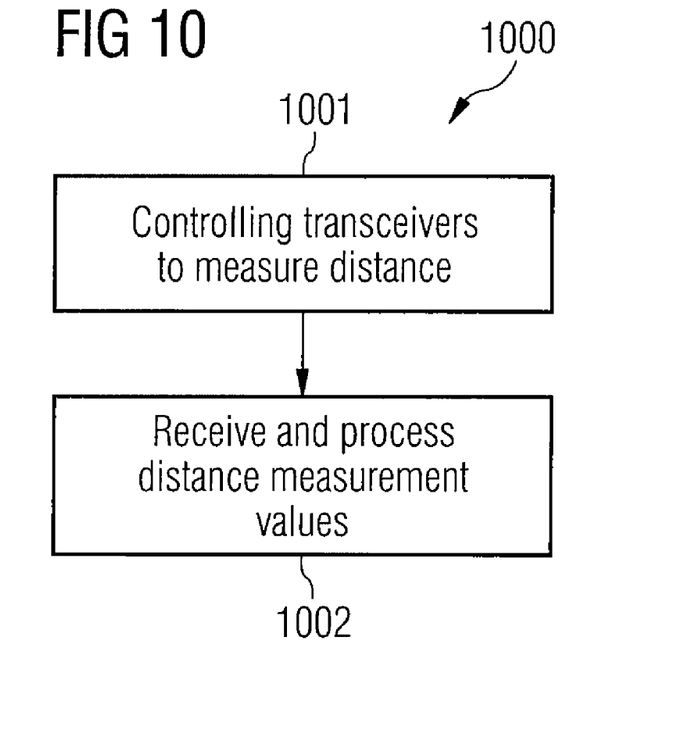
FIG. 10 shows a flow diagram according to an embodiment of the invention.
Figure 11:
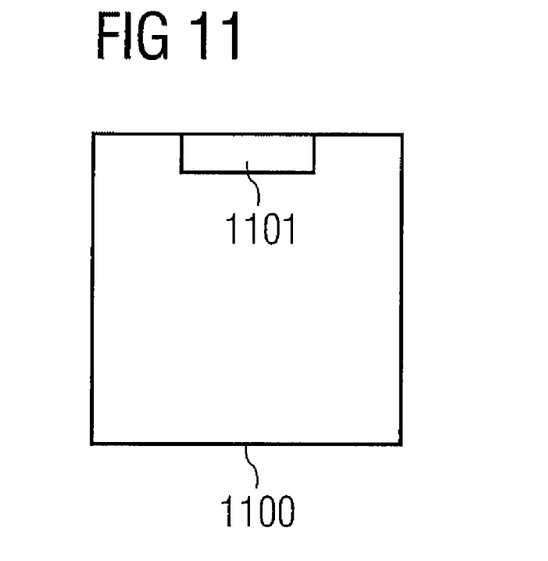
FIG. 11 shows a distance measurement managing circuit according to an—of the invention.

Possible embodiments of the invention are shown in FIG. 9, FIG. 10 and FIG. 11.

FIG. 9 shows a radio communication arrangement 900 according to an embodiment of the invention.

The radio communication arrangement 900 comprises a plurality of transceivers 901 and a distance measurement managing circuit 902.

The distance measurement managing circuit 902 is situated in a communication layer higher than the physical layer and is coupled with the plurality of transceivers 901. It controls the plurality of transceivers 901 for measuring the distance of the plurality of transceivers 901 to a specified position, and receives and processes distance measurement values determined by the plurality of transceivers.

FIG. 10 shows a flow diagram 1000 according to an embodiment of the invention.

In 1001 a distance measurement managing circuit being situated in a communication layer higher than the physical layer and being coupled with a plurality of transceivers controls the plurality of transceivers for measuring the distance of the plurality of transceivers to a specified position.

In 1002, distance measurement values determined by the plurality of transceivers are received and processed by the distance measurement managing circuit.

FIG. 11 shows a distance measurement managing circuit 1100 according to an embodiment of the invention.

The distance measurement managing circuit 1100 is situated in a communication layer above the physical layer. It is accessible by a service access point 1101 for determining at least on transceiver of a radio communication device which is to be used for determining the distance of the radio communication device to a specified position.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims and therefore intended to be embraced.

What is claimed is:

1. A radio communication device, comprising:
   a plurality of transceivers; and
   a distance measurement managing circuit, which is situated in a communication layer higher than the physical layer and is coupled with the plurality of transceivers, configured to control the plurality of transceivers to measure respective distances of the plurality of transceivers to a specified position, and configured to receive and process distance measurement values measured by the plurality of transceivers.

2. The radio communication device according to claim 1, wherein the distance measurement managing circuit is configured to determine the distance of the radio communication device to the specified position using the distance measurement values.

3. The radio communication device according to claim 1, wherein the radio communication device is part of a mobile communication network, and the distance measurement managing circuit is part of a core network of the mobile communication network.

4. The radio communication device according to claim 1, wherein the communication layer is one layer selected from the group of layers consisting of the session layer, the presentation layer or the application layer.

5. The radio communication device according to claim 4, wherein the communication layer is the L2CAP layer or the application layer in a Bluetooth system architecture.

6. The radio communication device according to claim 1, wherein the distance measurement managing circuit is configured to control the plurality of transceivers such that at least two transceivers of the plurality of transceivers measure the respective distances of the at least two transceivers to the specified position simultaneously.

7. The radio communication device according to claim 1, wherein the distance measurement managing circuit is configured to process the distance measurement values by determining an average value for at least two of the distance measurement values.

8. The radio communication device according to claim 7, wherein the at least two distance measurement values are determined by at least two different transceivers of the plurality of transceivers.

9. The radio communication device according to claim 1, wherein the plurality of transceivers are short-range radio transceivers.

10. The radio communication device according to claim 9, wherein the plurality of transceivers are Bluetooth transceivers.

11. The radio communication device according to claim 1, wherein the specified position is the position of another transceiver.

12. The radio communication device according to claim 11, wherein the other transceiver is a short-range radio transceiver.

13. The radio communication device according to claim 11, wherein the other transceiver is a Bluetooth transceiver.

14. The radio communication device according to claim 1, further comprising a distance measurement circuit, wherein the distance measurement managing circuit is configured to control the distance measurement circuit to determine the distance of the distance measurement circuit to the specified position, and the distance measurement managing circuit is further configured to receive and process distance measurement values determined by the plurality of transceivers and the distance measurement circuit.

15. The radio communication device according to claim 14, wherein the distance measurement circuit is a satellite navigation system receiver.

16. The radio communication device according to claim 1, wherein the distance measurement management circuit comprises a correction circuit configured to adapt a distance measurement value received from at least one transceiver of the plurality of transceivers based on control information, which is received from the at least one transceiver, wherein the control information specifies reliability of the respective distance measurement value.

17. The radio communication device according to claim 16, wherein the correction circuit is a dynamic correction circuit.

18. The radio communication device according to claim 16, wherein the correction circuit is a static correction circuit, which adapts the respective distance measurement value of the at least one transceiver based on at least one stored statistical correction factor.

19. A method for distance measuring, comprising:
   controlling a plurality of transceivers of a radio communication device to measure respective distances of the plurality of transceivers to a specified position by a distance measurement managing circuit, which is situated in a communication layer higher than the physical layer and is coupled with the plurality of transceivers; and
   receiving and processing distance measurement values determined by the plurality of transceivers by the distance measurement managing circuit.

20. The method according to claim 19, wherein the communication layer is one layer selected from the group of layers consisting of the session layer, the presentation layer or the application layer.

21. The method according to claim 19, wherein the communication layer is the L2CAP layer or the application layer in a Bluetooth system architecture.

22. The method according to claim 19, further comprising controlling the plurality of transceivers such that at least two transceivers of the plurality of transceivers measure the respective distances of the plurality of transceivers to the specified position simultaneously.

23. The method according to claim 19, further comprising processing the distance measurement values by determining an average value for at least two of the distance measurement values.

24. The method according to claim 23, wherein the at least two distance measurement values are determined by at least two different transceivers of the plurality of transceivers.

* * * * *